Sept. 25, 1962 D. S. J. SMITH 3,056,113

BINARY CODE STORAGE SYSTEM

Filed Nov. 10, 1958

4 Sheets-Sheet 1

INVENTOR.
DAVID S. J. SMITH

BY

Richard G. Stahr

ATTORNEY

Sept. 25, 1962 D. S. J. SMITH 3,056,113

BINARY CODE STORAGE SYSTEM

Filed Nov. 10, 1958

4 Sheets-Sheet 2

Sept. 25, 1962 D. S. J. SMITH 3,056,113

BINARY CODE STORAGE SYSTEM

Filed Nov. 10, 1958 4 Sheets-Sheet 3

| R3 OR S3 | | R4 OR S4 | | R5 OR S5 | | |
|---|---|---|---|---|---|---|
| A | B | A | B | A | B | |
| 0 | 1 | 0 | 1 | 0 | 1 | Y0 |
| 1 | 0 | 0 | 1 | 0 | 1 | Y1 |
| 0 | 1 | 1 | 0 | 0 | 1 | Y2 |
| 1 | 0 | 1 | 0 | 0 | 1 | Y3 |
| 0 | 1 | 0 | 1 | 1 | 0 | Y4 |
| 1 | 0 | 0 | 1 | 1 | 0 | Y5 |
| 0 | 1 | 1 | 0 | 1 | 0 | Y6 |
| 1 | 0 | 1 | 0 | 1 | 0 | Y7 |

| C0 | | C1 | | C2 | | |
|---|---|---|---|---|---|---|
| A | B | A | B | A | B | |
| 0 | 1 | 0 | 1 | 0 | 1 | X0 |
| 1 | 0 | 0 | 1 | 0 | 1 | X1 |
| 0 | 1 | 1 | 0 | 0 | 1 | X2 |
| 1 | 0 | 1 | 0 | 0 | 1 | X3 |
| 0 | 1 | 0 | 1 | 1 | 0 | X4 |
| 1 | 0 | 0 | 1 | 1 | 0 | X5 |
| 0 | 1 | 1 | 0 | 1 | 0 | X6 |
| 1 | 0 | 1 | 0 | 1 | 0 | X7 |

United States Patent Office 3,056,113
Patented Sept. 25, 1962

3,056,113

BINARY CODE STORAGE SYSTEM

David S. J. Smith, Rochester, N.Y., assignor to General Dynamics Corporation, Rochester, N.Y., a corporation of Delaware Filed Nov. 10, 1958, Ser. No. 772,804
1 Claim. (Cl. 340—173)

Figures 1, 4:
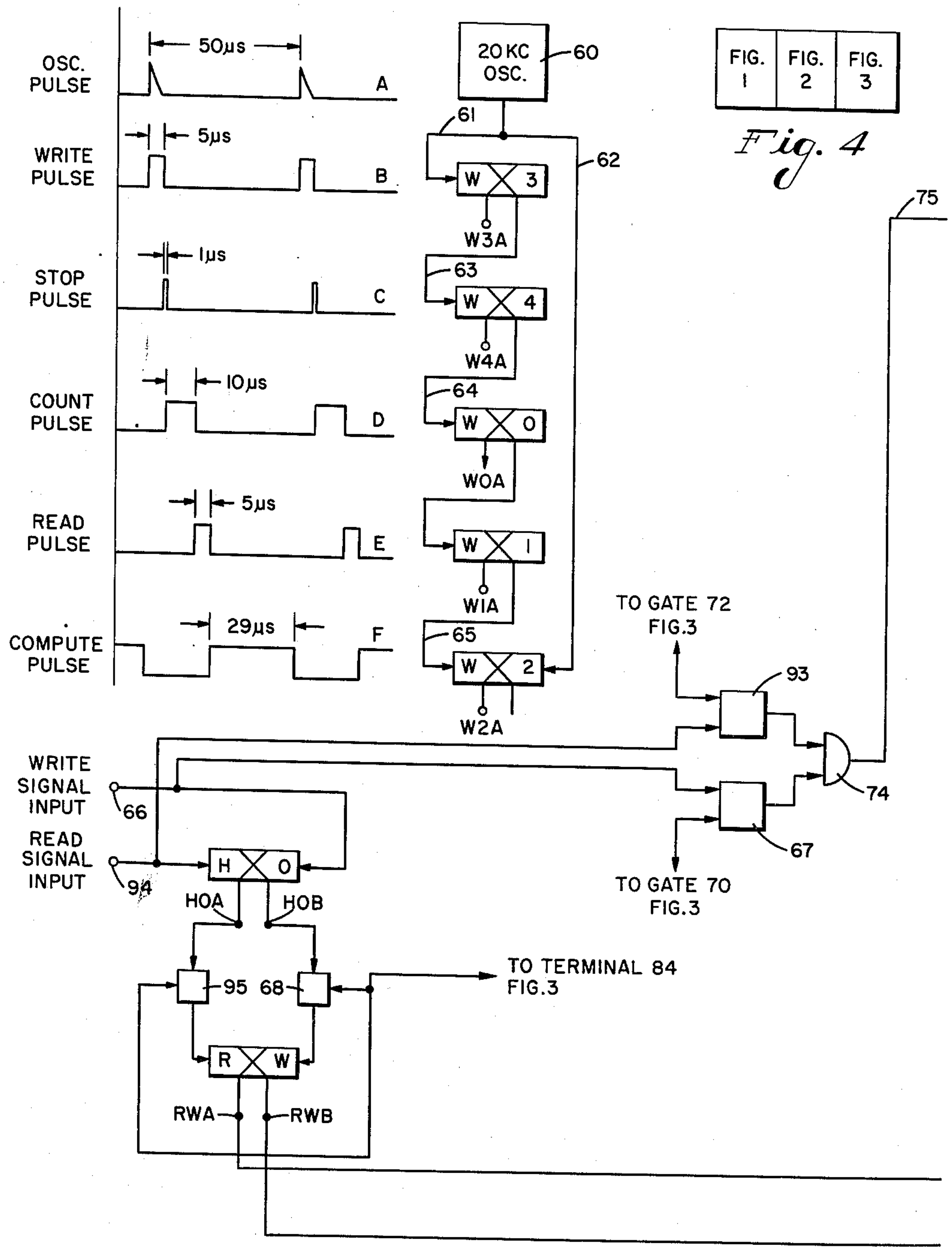

This invention relates to binary code storage devices and, more specifically, to the system for producing a signal which provides access to any one of the several character positions in a storage medium into which a character is to be received or from which a character is to be withdrawn.

In the handling of masses of information expressed in binary form, it is often convenient and desirable to provide a storage device into which the information available is stored and retained until used at some future time. In prior art devices, particularly those employing a matrix of magnetic cores or other active binary elements as the storage medium, the information to be filed was stored temporarily in one of the character positions of the storage medium until the next element of information was to be received and filed. At this time, the stored information was read out into a buffer storage and transferred to the next character position to allow room for the latest element of information to be stored in the initial character position. This routine of transfer from one character position to the next was followed as additional elements of information were received. As information was wished to be read out or withdrawn from the matrix, it was taken off the last occupied character position and the system would automatically advance the information still stored to the following character positions, thereby preparing the storage medium for a readout of the next information.

In view of the complex circuitry and additional components required to provide a working system with this arrangement, it is desirable to produce a device with which it is no longer necessary to transfer information from one character position to the next, thereby eliminating considerable circuitry and increasing the speed of such a storage device.

It is, therefore, an object of this invention to provide an improved binary code storage device.

It is another object of this invention to provide an improved binary code storage device in which it is unnecessary to transfer information from one word position to the next.

It is another object of this invention to provide an electrical circuit which will produce an access signal which provides access to any one of the several character positions of a storage medium into which a character is to be received or from which a character is to be withdrawn.

In accordance with this invention, the one character position next succeeding the last of the character positions into which a character has been received or from which a character has been withdrawn is stored in the form of a different combination of a plurality of electrical signals for each character position in respective storage circuits. From these circuits, the different combinations of electrical signals are presented to another circuit which produces an access signal in response to the presence of any one of the combination of electrical signals and directs this access signal to an access circuit which is associated with the working circuit in operative arrangement with the character position of the storage medium to which the combination of electrical signals present corresponds.

Figure 2:
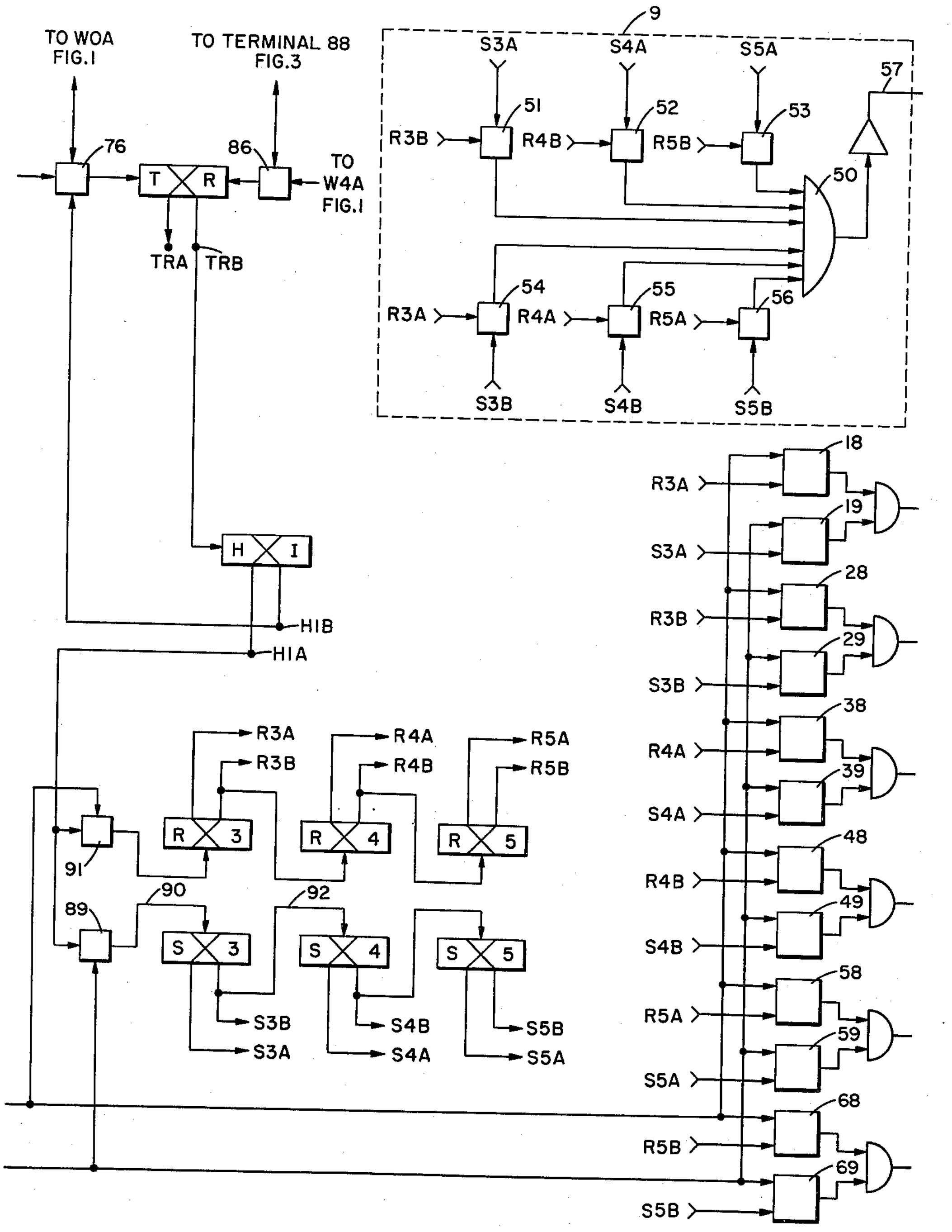
Figure 3:
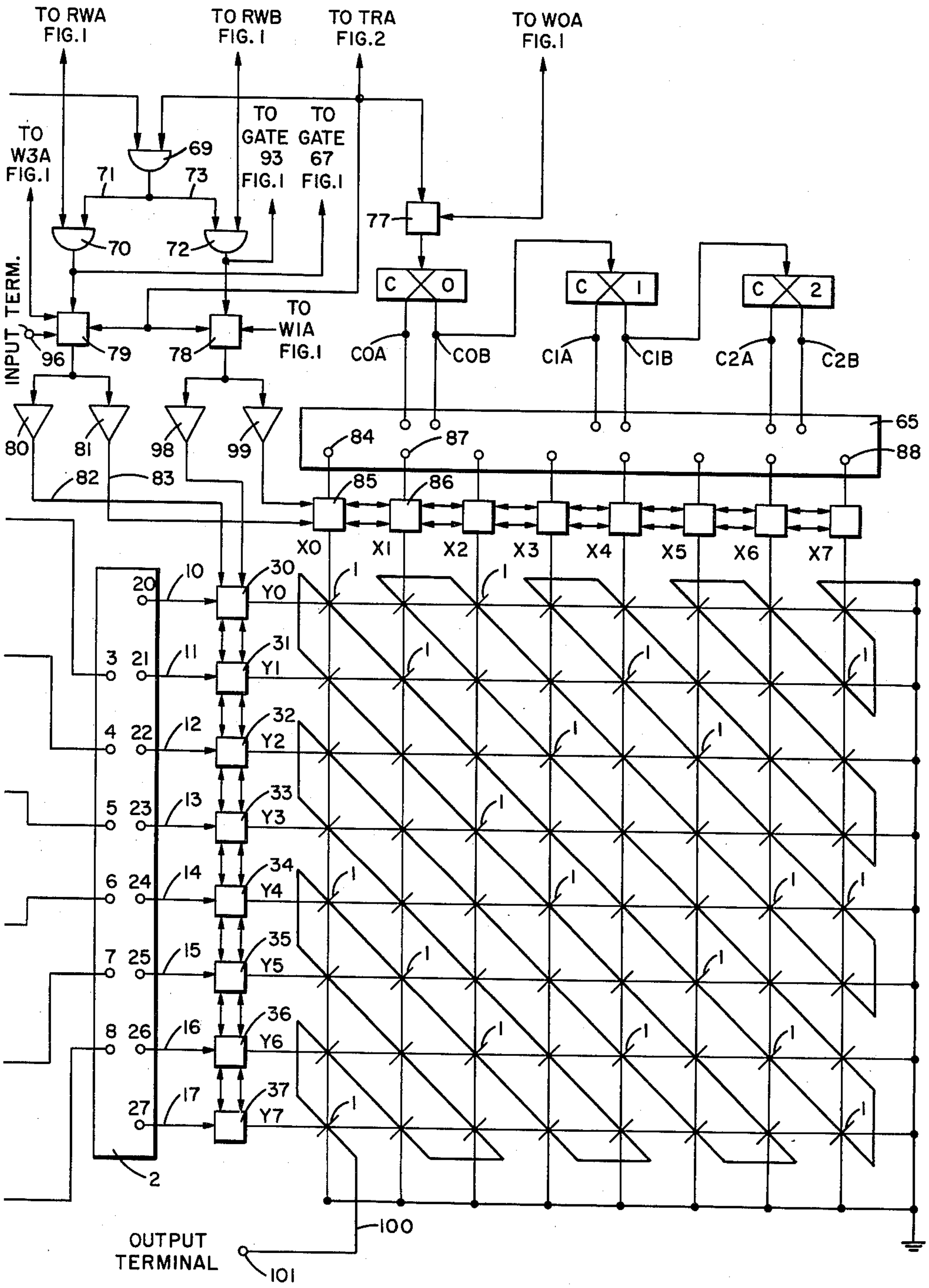
Figures 5, 6, 7:
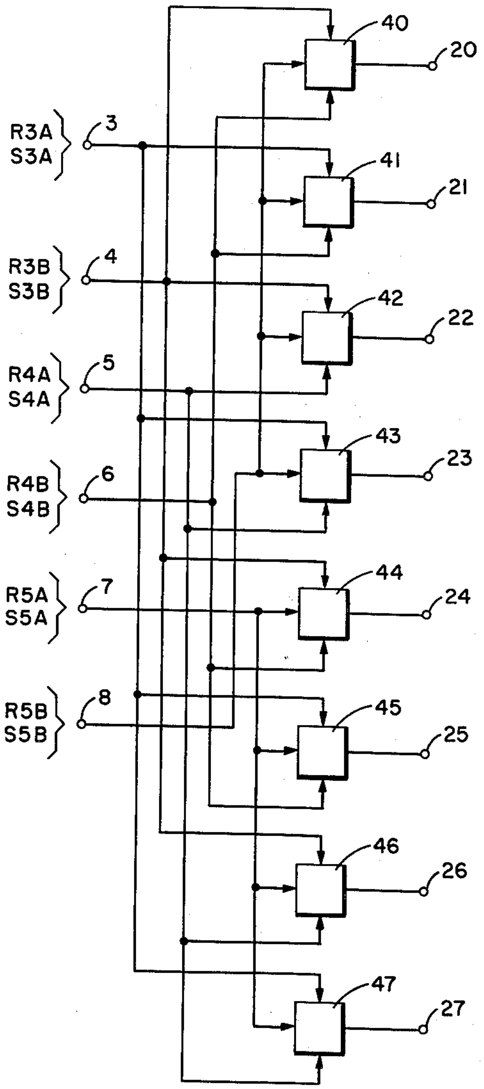

For a better understanding of the present invention, together with further objects, advantages and features thereof, reference is made to the following description and accompanying drawings, in which:

FIGURES 1, 2 and 3, when arranged as indicated in FIGURE 4, constitute an overall diagram of one embodiment of the system of this invention;

FIGURE 5 details the decoder tree indicated at reference numeral 2 of FIGURE 3;

FIGURE 6 is a table indicating the various combinations of electrical signals for each access circuit of FIGURE 3; and FIGURE 7 is a table indicating the combinations of electrical signals for each auxiliary access circuit of FIGURE 3.

While the present description is in reference to the application of the system of this invention to a storage device which employs a matrix of magnetic members as the storage medium, it is to be specifically understood that this invention may be used with a storage device employing any storage medium.

While FIGURES 1, 2 and 3, when arranged as indicated in FIGURE 4, constitute an overall diagram of the storage device embodying the principles of this invention, the storage medium employed, which has been assumed for purposes of illustration only to be a matrix of magnetic cores, is schematically illustrated in FIGURE 3 where the several cores comprising the matrix are indicated as short diagonal lines making acute angles to the right and are typically identified by reference numeral 1. The several magnetic members are of the type having relatively square hysteresis loop characteristics and, therefore, two stable states of operation as is well known in the art. These magnetic members are arranged in columns and rows where each column corresponds to a binary information bit position within the binary code group employed and each row corresponds to a single character position. Assuming for purposes of illustration only that the binary code employed is an eight bit per group code and that the capacity of the storage medium be eight characters, the matrix of magnetic members comprising the storage medium, therefore, consists of eight rows of magnetic members with eight members per row, as indicated.

So that a character may be received into each character position of the storage medium, an individual working circuit in operative arrangement with each position is required. In the case of magnetic members, these individual working circuits may be coils which are coupled to each of the magnetic members of the respective rows by coupling windings of one or more turns and are herein illustrated as straight horizontal lines at Y0, Y1, Y2, Y3, Y4, Y5, Y6 and Y7.

In a storage device employing the principle of the system of this invention, the characters are stored in that character position next succeeding the last position into which a character has been received and are removed from that character position next succeeding the last of the positions from which a character has been withdrawn. Assuming that the storage medium is empty and that a series of characters are received to be stored, the initial character is directed to that character position with which working circuit Y0 is in operative arrangement, the second is directed to that character position with which working circuit Y1 is in operative arrangement, the third character is directed to that character position with which working circuit Y2 is in operative arrangement, etc. In the event it should be desired to withdraw a character at this time or at any time subsequent to the receipt of the first character, the character which is stored in that character position with which working circuit Y0 is in operative arrangement will be withdrawn first. Should a second character be withdrawn at this time, it would be from that character position with which working circuit Y1 is in operative arrangement, etc.

To accomplish this, an access circuit associated with each character position working circuit is provided. These access circuits are indicated in FIGURE 3 at reference numerals 10, 11, 12, 13, 14, 15, 16 and 17 and are associated with respective working circuits Y0, Y1, Y2, Y3, Y4, Y5, Y6 and Y7. Interposed between each access circuit and its associated working circuit is a switching circuit sensitive to an access signal which will appear in these access circuits, in a manner to be later explained. These switching circuits may be in the form of AND gates of the type which will produce an output signal only upon the coincident presence of a signal at each of its two input terminals. As the details of this type circuit are well known in the art and form no part of this invention, they have been indicated in block form in FIGURE 3 at 30, 31, 32, 33, 34, 35, 36 and 37. As the significance of these AND circuits in the operation of this system will be detailed later in this specification, it will be sufficient to state for the present that access to any one of the working circuits may be gained only with the presence of an access signal in the access circuit associated therewith.

To provide a reference for the production of the required access signals, the one character position next succeeding the last character position into which a character has been received and from which a character has been withdrawn are separately stored in the form of a different combination of a plurality of electrical signals for each character position.

One method of producing these various combinations of electrical signals involves the use of two or more circuits each having an input and two output circuits and two stable conditions of operation which may be alernately produced through the application of a pulse having a sensitive wave front to the input circuit and connecting these circuits in cooperative arrangement with each other whereby the second change of condition of operation of any one produces a sensitive wave front which operates the succeeding one. These circuits are well known in the art as "flip-flops" and "binary counters," respectively, and will hereinafter be referred to as such.

As each flip-flop has two stable conditions of operation, the number of different combinations of electrical pulses which may be obtained from one or more is the digit 2 raised to the $n^{th}$ power where $n$ is the number of flip-flops used. To obtain eight different combinations of electrical pulses, one for each character position in accordance with the previous assumption, therefore, each binary counter must be comprised of three flip-flops or $2^3$. It is to be understood, however, that more or less character positions would require the use of correspondingly more or less flip-flops for each binary counter.

In FIGURE 2, the binary counter, hereinafter referred to as the "read" counter, which stores the one character position next succeeding the last character position into which a character has been received consists of three flip-flop circuits indicated in block form at R3, R4 and R5, while the binary counter, hereinafter referred to as the "write" counter, which stores the one character position next succeeding the last character position from which a character has been withdrawn consists of three flip-flop circuits indicated in block form at S3, S4 and S5.

Each flip-flop is provided with an output circuit for each side or a total of two output circuits, indicated at R3A and R3B, R4A and R4B, R5A and R5B, S3A and S3B, S4A and S4B, and S5A and S5B, or a total of six output circuits for each the "read" and "write" counters, respectively. For purposes of clarity, throughout the specification the presence of a signal in any of these output circuits will be referred to as the "1" condition of operation while the absence of a pulse will be referred to as the "0" condition of operation.

The combination of electrical signals which corresponds to each character position is shown in tabular form in FIGURE 6 where each column corresponds to a respective flip-flop output circuit and each row corresponds to a respective character position which is identified by the reference numeral which designates the working circuit in operative arrangement therewith. That is, the first character position may be stored in the form of an electrical signal at R3B, R4B and R5B or S3B, S4B and S5B, indicated by a "1" in the second, fourth and sixth columns. The next character position may be stored in the form of a combination of electrical signals appearing at R3A, R4B and R5B or S3A, S4B and S5B, indicated by a "1" in the first, fourth and sixth columns. The third position may be represented by a combination of electrical signals appearing at R3B, R4A and R5B or S3B, S4A and S5B, indicated by a "1" in the second, third and sixth columns. By referring to the table it may be seen that a different combination of signals is possible for each character position, the last position into which a character has been received and the last position from which a character has been withdrawn being stored in separate counters. A detailed description of the operation of these respective counters will appear later in this specification.

To decode the various different combinations of electrical signals stored in the counters hereinbefore described, a circuit which is sensitive to the presence of any one of the combinations of electrical signals is provided. This circuit, well known in the art as a decoder tree and as such will hereinafter be referred, illustrated in block form at 2 in FIGURE 3 and detailed in FIGURE 5, produces an access signal and directs this access signal to that one access circuit which is associated with the working circuit in operative arrangement with the character position to which said combination of electrical signals present corresponds.

The decoder tree circuit is provided with six input terminals, indicated in FIGURE 3 at reference numerals 3, 4, 5, 6, 7 and 8, to which are connected the respective output circuits of each binary counter. That is, output circuits R3A and S3A; R3B and S3B; R4A and S4A; R4B and S4B; R5A and S5A; and R5B and S5B are connected to input terminals 3, 4, 5, 6, 7 and 8, respectively. So that only one combination of electrical signals may be presented to the decoder tree at a time, a series of AND gates each of the type which will produce an output signal only upon the coincident presence of a signal at each of two input terminals are interposed between the input terminals of the decoder tree and the output circuits of the respective binary counters. Since the details of these gate circuits are well known in the art and form no part of this invention, they are illustrated in block form in FIGURE 2 at reference numerals 18, 19, 28, 29, 38, 39, 48, 49, 58, 59, 68 and 69. A detailed description of the significance of these AND circuits in the operation of this system will be brought out later in this specification.

The decoder tree is also provided with eight output terminals, one for each working circuit of the storage medium, indicated in FIGURE 3 at reference numerals 20, 21, 22, 23, 24, 25, 26 and 27, to each of which is connected a respective one of the aforementioned access circuits 10, 11, 12, 13, 14, 15, 16 and 17.

A detail of the connections required for the proper operation of the decoder tree is shown in FIGURE 5 where like elements have been given like characters of reference. Basically, the decoder tree is comprised of a series of AND gates, one for each access circuit and, consequently, each working circuit, each of the type which produces an output signal only upon the coincident presence of a signal at each of three input terminals. As the details of this type AND gate circuit are well known in the art and form no part of this invention, they are indicated in FIGURE 5 in block form at reference numerals 40, 41, 42, 43, 44, 45, 46 and 47. Each of these AND gates is provided with three input terminals which, in the interest of reducing drawing complexity, have not been assigned reference numerals but have been indicated as arrowheads and a single output terminal which is connected to the respective output terminal of the decoder tree, as indicated. The signal which appears in any one of these several output terminals and, as a consequence, at any one of the output terminals of the decoder tree is the aforementioned access signal which must be present for the purpose of gaining access to any one of the several working circuits. Since, in this instance, each character position is stored in the form of a different combination of electrical signals which may appear in any three of the six output circuits of the respective binary counters, the binary counter output circuits must be interconnected with these gate circuits in such a manner that the access signal is produced in that gate, the output terminal of which is connected to the access circuit associated with the working circuit in operative arrangement with the character position to which the combination of electrical signals present corresponds. Referring again to the table of FIGURE 6, the first character position, with which working circuit Y0 is in operative arrangement, may be stored in the form of an electrical signal appearing at binary counter output circuits R3B, R4B and R5B or S3B, S4B and S5B. Therefore, input terminals 4, 6 and 8, to which these binary counter output circuits are connected, are connected to gate 40. Should this combination of electrical signals be presented to the decoder tree, they would be coincidentally impressed upon the respective input terminals of gate 40, resulting in the production of an output or access signal which would be directed to the working circuit Y0 which is in operative arrangement with the first character position in the storage medium through decoder tree output terminal 20, access circuit 10 and gate 30. By following the various connections through the decoder tree, it will be found that to no other gate are three coincident signals presented with this specific combination of electrical signals from the binary counters. In accordance with the various combinations of electrical signals which correspond to each character position as indicated in the table of FIGURE 6, therefore, input terminals 3, 6 and 8 are connected to gate 41, input terminals 4, 5 and 8 are connected to gate 42, input terminals 3, 5 and 8 are connected to gate 43, input terminals 4, 6 and 7 are connected to gate 44, input terminals 3, 6 and 7 are connected to gate 45, input terminals 4, 5 and 7 are connected to gate 46, and input terminals 3, 5 and 7 are connected to gate 47. As any one of the combinations of electrical signals are presented to the various input terminals of the decoder tree, therefore, an access signal is produced and directed to that access circuit associated with the working circuit in operative arrangement with the character position to which the received combination of electrical signals correspond.

In any storage system of this type, it is desirable to include an interlock system which will prevent the attempt to store additional characters when all of the character positions of the storage medium are full or to attempt to read out information when the storage medium is empty. Therefore, a sensing circuit is provided for the purpose of determining when the storage medium is full or empty and is illustrated in FIGURE 2 at reference numeral 9. As is indicated, this sensing circuit consists of a group of AND gates each of the type which will produce an ouput signal only upon the coincident presence of a signal at each of two input terminals. For the reasons as have previously been brought out, these AND circuits have been indicated in block form at reference numerals 51, 52, 53, 54, 55 and 56. For reasons which will be brought out later, this circuit is designed in such a manner that it produces an ouput signal at all times except when the storage medium is full or empty. As the respective "read" and "write" binary counters store that character position next succeeding the last character position into which a character has been received or from which a character has been withdrawn, it necessarily follows that when the same character position is stored in both binary counters, the storage medium must be full or empty. Therefore, the combinations of electrical signals stored in the respective binary counters may be used with the sensing circuit. By connecting the various outputs of the binary counter circuits to the input terminals of the AND gates of the sensing circuit in a manner as has been illustrated in FIGURE 2, the sensing circuit will produce an output signal at all times except when the storage medium is full or empty. In the interest of eliminating confusion and reducing drawing complexity, the physical connections between the binary counter output circuits and the input terminals of the gates in the sensing circuit have not been shown; rather, the various gate terminals have been labeled, as indicated. Referring again to the table of FIGURE 6, the combination of electrical signals corresponding to the first character position is the presence of an electrical signal at output terminals R3B, R4B and R5B of the "read" binary counter and at terminals S3B, S4B and S5B of the "write" binary counter. Therefore, should both binary counters have stored therein the initial character position, the sensing circuit would produce no output signal in that none of its gate circuits would have applied thereto the two coincident signals. At all other times, however, at least one of the gate circuits of the sensing circuit would have two coincident signals applied thereto. For instance, assume that the "read" binary counter had stored therein the initial character position and the "write" binary counter had stored therein the second character position. In this instance, gates 51, 52 and 53 would each have a signal impressed thereon from the respective output circuits, R3B, R4B and R5B, of the "read" binary counter while gates 51, 55 and 56 would each have a signal impressed thereon from the respective output circuits, S3A, S4B and S5B, of the "write" binary counter. Of these five gate circuits which have at least one signal impressed thereon, only gate 51 has two signals impressed thereon, thereby producing an output pulse. This pulse is impressed upon OR gate 50 of sensing circuit 9, through which it is passed to the output lead 57 to be used in a manner later to be described. As another example, assume that both the "read" and the "write" binary counters have stored therein the character position with which working circuit Y5 is in operative arrangement. In this instance, only one input terminal of each of the gates 51, 52, 53, 54, 55 and 56 would have a signal present thereon, but none of the gates would have two signals present, therefore, no output signal would be produced. Through the use of table 6, this analogy may be carried through all possible combinations to indicate that an output signal would be produced by sensing circuit 9 at all times except when the "read" and "write" binary counters have stored therein the same character position.

As all of the various circuits which are absolutely necessary for the practice of the present invention have now been presented and briefly described, a single embodiment of this invention in a practical storage device will now be described.

To provide a series of electrical clock pulses which are required for the proper operation of this one embodiment of the present invention, a series of monostable multivibrators, indicated in FIGURE 1 as W3, W4, W0 and W1, and a bistable multivibrator, illustrated in FIGURE 1 at W2, are provided. The monostable multivibrators are of the type which have one stable condition of operation but may be driven to the other condition of operation for an interval of time designed into them, at the end of which they reverse to their initial operating condition, while the bistable multivibrator is of the type which remains in its last stable condition of operation until driven to the other stable condition of operation by a sensitive wave front pulse, in which condition it remains until the opposite side is energized by a sensitive wave front pulse. The circuits of both types multivibrators are well known in the art and form no part of this invention, therefore, they are indicated in block form. Assume for purposes of this specification that the right side of each of the monostable multivibrators is the side which is normally conducting and that a sensitive wave front pulse is produced upon the transfer of either side from the "0" to the "1" condition of operation. The right output circuit of each of these multivibrators is connected to the input circuit of the next succeeding multivibrator, as indicated. This series of multivibrators is driven by an oscillator which, since the details form no part of this invention and are well known in the art, is indicated in block form at 60 in FIGURE 1. Assuming for purposes of illustration that this oscillator has a frequency of twenty kilocycles, it will produce an output pulse every fifty microseconds, as indicated by curve A, FIGURE 1. Upon the occurrence of an output pulse from the oscillator 60, a sensitive wave front pulse is applied to the input circuit of monostable multivibrator W3 through lead 61 and to the right side input circuit of bistable multivibrator W2 through lead 62, as shown. At this time, the right side of multivibrator W2 is rendered conductive and the left side of multivibrator W3 is rendered conductive in which condition it remains for the interval of time designed into the circuit, at the conclusion of which the right side again becomes conductive. As the right side of multivibrator W3 again becomes conductive, the condition of operation of this side is transferred from the "0" to the "1" state, thereby producing a sensitive wave front pulse which is applied to the input circuit of multivibrator W4 through lead 63. This sensitive wave front pulse, of course, will render the left side of multivibrator W4 conducting for the time interval designed therein, at the conclusion of which the right side will again become conductive, producing a sensitive wave front pulse which is applied to the input circuit of multivibrator W0 through lead 64. This chain of events may be traced through the next multivibrator W1 and finally to the bistable multivibrator W2. The left side of bistable multivibrator W2 is rendered conductive by the sensitive wave front pulse applied thereto from the right output circuit of multivibrator W1 through lead 65, in which condition it remains until the occurrence of the next oscillator output pulse, at which time this sequence of events will again repeat. Assuming for purposes of illustration that the time delay designed into multivibrators W3, W4, W0 and W1 to be 5, 1, 10 and 5 microseconds, respectively, a series of short pulses are thereby produced. These pulses are graphically illustrated in FIGURE 1 at curves B, C, D and E, respectively, and, for purposes of clarity, will be entitled write pulse, stop pulse, count pulse and read pulse, respectively. The output of the left side of bistable multivibrator W2 is in the form of a pulse 29 microseconds long, as indicated by the curve F of FIGURE 1. It will be noted that 29 microseconds is the difference between the total of the other four pulses and 50 microseconds, the frequency of oscillator 60. Therefore, with each oscillation of oscillator 60, a series of five pulses of 5, 1, 10, 5 and 29 microseconds duration are produced. The significance of these pulses in relation to the operation of the remainder of the circuit will be brought out in detail later.

The storage medium to be employed in this single embodiment of the present invention has been assumed to be a matrix of magnetic cores arranged in columns and rows wherein each row is a character position. To store a character expressed in binary form, therefore, each magnetic core in each character position or row must be placed in the condition of magnetic remanence corresponding to "mark" or "space" bits. Assuming for purposes of illustration that the "1" condition of remanence represents "mark" bits and the "0" condition of remanence represents "space" bits, in the initial condition of operation, all cores of the matrix are in their "0" condition of remanence. To store a character in any of the character positions, therefore, those magnetic cores in any one of the rows which correspond to the "mark" bit positions within the binary code group must have their condition of remanence transferred to the "1" condition. As the working circuit associated with each character position is energized during the time that an access signal, previously described, is directed thereto, it is necessary that this energizing current be less than that required to switch the condition of magnetic remanence of the cores to prevent the switching of all cores of that character position. So that selected cores may be switched, therefore, it is necessary that secondary working circuits be associated with all of the respective cores of each row. These secondary working circuits may also be coils coupling the several respective cores in series by coupling windings of one or more turns and are indicated in FIGURE 3 as straight vertical lines at X0, X1, X2, X3, X4, X5, X6 and X7. The current flowing in these coils, of course, is also less than that required to change the condition of magnetic remanence of the several magnetic cores. However, the currents in the working circuits and in the secondary working circuits are of such a magnitude that the sum of them is sufficient to change the state of magnetic remanence. Upon the coincident occurrence of an energizing current in the working circuit and the secondary working circuits, however, those cores intercepted thereby will have their condition of magnetic remanence switched. Therefore, another binary counter, comprising flip-flop circuits C0, C1 and C2, FIGURE 3, and decoder tree, illustrated in block form at 65, FIGURE 3, are required to direct this energizing signal to the proper column. Assuming the matrix to be empty and the system is in condition to receive and store information expressed in binary form, the "read" binary counter and the "write" binary counter each have stored therein that combination of electrical signals which corresponds to the first character position and the access signal produced thereby is directed to working circuit Y0, the auxiliary binary counter has stored therein that combination of electrical signals corresponding to the eighth column of cores and decoder tree 65 is directing an auxiliary access signal to auxiliary working circuit X7. The system is alerted for the reception of a character to be stored upon the receipt of an externally generated write signal through terminal 66, FIGURE 1, from which it is applied to the right input circuit of a bistable multivibrator H0 and to one of the input terminals of an AND gate illustrated in block form at 67. The presence of the externally generated write signal upon the right input circuit of multivibrator H0 triggers the multivibrator and renders the right side conducting, thereby producing a signal at its right output terminal H0B. This signal is applied to one of the terminals of an AND gate, illustrated in block form at reference numeral 68. Associated with multivibrator H0 is another bistable multivibrator RW which is employed for the purpose of remembering whether the last operation performed by the system was "read" or "write" and for producing "read" reference signals in response to an externally generated "read" pulse and "write" reference signals in response to an externally generated "write" pulse. The appearance of a signal at its left output terminal RWA is a "read" reference signal and indicates that the last operation was "read," while the appearance of a signal at its right output terminal RWB is a "write" reference signal and indicates that the last operation was "write." As the matrix is empty at this time, the last operation performed by the system was a "read" operation; therefore, the condition of conduction of multivibrator RW is such to produce a signal, the significance of which will be explained later, at its left output terminal RWA.

As has been brought out before, when the matrix is full or empty, in which condition the "read" binary counter and the "write" binary counter has stored therein the same character position, the sensing circuit 9, FIGURE 2, does not produce an output signal. Referring to FIGURE 3, the output circuit lead 57 of the sensing circuit 9 is impressed upon one input terminal of an OR gate indicated at reference numeral 69. Assuming for the moment that there is also no signal present in the TRA lead which is connected to the other input terminal of OR gate 69, there is no output signal produced therefrom. The output terminal of gate 69 is connected to one input terminal of another OR gate 70 through lead 71 and to one input terminal of another OR gate 72 through lead 73. The other input terminal of gate 70 is connected to the RWA terminal of relay RW of FIGURE 1, as labeled, while the other input terminal of gate 72 is connected to the RWB terminal of the RW of FIGURE 1, as labeled. In this instance, then, a signal will appear in the output circuit of gate 70 in that the left side of the RW relay is in conduction, thereby producing a signal at its left output terminal RWA. However, since there is no output signal present in the right output terminal RWB of multivibrator RW, there will be no output signal present in the output circuit of gate 72. The signal appearing in the output circuit of gate 70 will be termed a "write" enabling pulse which is applied to one of the input terminals of AND gate 67, FIGURE 1, as labeled. With the presence of the "write" enabling pulse upon one input terminal of gate 67 and the "write" signal present upon the other input terminal of gate 67, an output pulse is produced in the output terminal thereof which is applied through OR gate 74 and lead 75 to one of the input terminals of an AND gate 76.

Multivibrator H1, associated with multivibrator TR, is of the monostable type in which the right side is normally conducting. The application of a sensitive wave front pulse to the left input terminal thereof will produce conduction through the left side of multivibrator H1 for a specified period of time designed into the delay circuit therein, at the conclusion of which the right side again becomes conductive, producing a signal on the right output circuit terminal H1B. Assuming that the H1 multivibrator has timed out, there is now present upon the right output terminal H1B thereof a signal which is applied to one of the other input terminals of gate 76. However, the signal is not permitted to be passed by gate 76 until such time that a count pulse, produced by multivibrator W0 of the clock circuit, is applied to the third input terminal of gate 76 from terminal W0A, FIGURE 1, as labeled.

As the clock circuit continues through its cycle and the operating condition of multivibrator W0, FIGURE 1, is transferred to the left side thereof for a period of 10 microseconds, as indicated by curve D, the signal present in the left output circuit W0A is applied to the third input terminal of gate 76, FIGURE 2, as labeled. Upon the occurrence of the signal at W0A, the three input terminals to gate 76 are energized, thereby producing an output pulse which is applied to the left input circuit of multivibrator TR, as indicated. As the condition of conduction of multivibrator TR is transferred to the left side, an output signal, the significance of which will be brought out later, appears in its left terminal TRA.

As the clock continues through its cycle a count pulse is again produced in the left output circuit terminal W0A of multiivibrator W0. While this signal is again applied to the same input terminal of gate 76, it produces no effect in the operation of multivibrator TR as this multivibrator is already in the condition of operation previously produced upon the occurrence of a signal at W0A. However, this signal is also applied to one of the input terminals of an AND gate indicated at reference numeral 77, FIGURE 3. The other input terminal of AND gate 77 is connected to the left output terminal TRA of multivibrator TR, as labeled. As an output signal is present in output terminal TRA, as previously described, the occurrence of the 10 microsecond count pulse appearing upon terminal W0A of multivibrator W0 will produce an output pulse in the output circuit of gate 77 which is applied to the C0 flip-flop of the auxiliary counter. Since, as has been previously brought out, the auxiliary counter is pointing to auxiliary working circuit X7, the condition of operation of flip-flop C0 is such that an output pulse is present upon its left output terminal C0A, as indicated in FIGURE 7. The occurrence of the output pulse from gate 77 is sensitive to transfer the condition of operation of multivibrator C0 to that state in which an output pulse appears in its right output circuit terminal C0B. In the present condition, therefore, the auxiliary counter has stored therein the combination of electrical signals corresponding to the column of cores with which auxiliary working circuit X0 is associated in that an output electrical signal is present in each of the respective output circuits C0B, C1B and C2B. In accordance with the table of FIGURE 7, this is the combination of electrical signals corresponding to auxiliary working circuit X0.

As the clock continues through its cycle and multivibrator W1, FIGURE 1, is activated, a 5 microsecond read pulse, as indicated in curve E, is present upon the output terminal W1A. This pulse is applied to one input terminal of an AND gate indicated at reference numeral 78, FIGURE 3, as labeled. However, this pulse is, for the moment, ineffective in that there is no read enabling signal present at the other input terminal at gate 78, for reasons previously brought out.

As the sequence of the clock continues through multivibrator W2, and multivibrator W3 is rendered active, a 5 microsecond write pulse, indicated at curve B, FIGURE 1, is present upon the left output circuit W3A thereof. This write pulse is applied to one of the input terminals of an AND gate indicated by reference numeral 79, FIGURE 3, as labeled. The other input terminals of AND gate 79 are connected to the left output terminal TRA of multivibrator TR, as indicated, to OR gate 70 and to the input terminal 96 of the system. Therefore, upon the simultaneous occurrence of a "mark" bit at the input terminal 96 and the write pulse from terminal W3A, an output pulse appears in the output terminal of gate 79 in that a write enabling pulse from gate 70 is also present, as previously described, and a pulse is also present upon output terminal TRA, as previously described. This pulse is then directed through parallel amplifiers 80 and 81 and through leads 82 and 83 to the AND gates associated with the working circuits Y0, Y1, Y2, Y3, Y4, Y5, Y6 and Y7 and to the AND gates associated with secondary working circuits X0, X1, X2, X3, X4, X5, X6 and X7, respectively. These gates are connected in parallel in reference to leads 82 and 83 and 98 and 99, which is indicated by the double-headed arrows interconnecting them.

Since the auxiliary counter has stored therein that combination of electrical signals corresponding to auxiliary working circuit X0, the decoder tree 65 to which it is connected produces a signal at its output terminal 84 which is directed to AND gate 85 interposed between terminal 84 and auxiliary working circuit X0. Also, the write counter has stored therein that combination of electrical signals corresponding to working circuit Y0, therefore, an electrical signal is present at each flip-flop output terminals S3B, S4B and S5B which is impressed upon one input terminal of gates 28, 49 and 69, respectively. At this same time, the "write" reference signal present at the RWB terminal of multivibrator RW, FIGURE 1, is applied simultaneously to the other input terminals of gates 28, 49 and 69. Therefore, the coincident appearance of a signal at both input terminals of gates 28, 49 and 69 results in an output signal at the output terminals thereof. These signals are applied to input terminals 4, 6 and 8 of decoder tree 2, FIGURE 2, which, as has been previously explained, produces an access signal and directs this signal to working circuit Y0 through terminal 20 of decoder tree 2, access circuit 10 and gate 30. The combination of signals present at gate 85, that, is, the signal from output terminal 84 and from amplifier 81 through lead 83 produces an output pulse in auxiliary working circuit X0; while the combination of signals present at gate 30, that is, the access signal applied through access circuit 10 and the signal applied from amplifier 80 through lead 82 permits an energizing current to appear in working circuit Y0. As the algebraic sum of these currents is of sufficient magnitude to switch a magnetic core, the core which is intersected by both these circuits is changed to its one state of magnetic remanence, corresponding to a "mark" information bit.

It should be pointed out at this time that the combination of electrical signals which is present upon the respective flip-flop output circuits of the "read" binary counter are also presented to the respective ones of gates 18, 19, 28, 29, 38, 39, 48, 49, 58, 59, 68 and 69. However, this signal is not passed by these gates because a "read" reference signal is not present upon the RWA terminal of the RW multivibrator FIGURE 1. The function of these gates therefore, is to pass either that combination of electrical signals corresponding to the next character position into which a character is to be received or that combination of electrical signals corresponding to the next character position from which a character is to be withdrawn to decoder tree 2, mutually exclusive of each other.

As the clock continues through its sequence, a 1 microsecond stop pulse appears upon the left output terminal W4A of multivibrator W4. This pulse is applied to a gate circuit 86, FIGURE 2, as labeled. However, it is ineffective at this time in that the other input terminal of gate 86 is connected to terminal 88 of decoder tree 65, as labeled, which is not energized at this time. Therefore, the required two input pulses are not present to produce an output pulse from gate 86.

As the clock continues its sequence, another 10 microsecond count pulse, curve D, FIGURE 1, appears on the left output circuit W0A of multi-vibrator W0. This pulse is applied to gate 77, FIGURE 3, along with the output pulse still present upon the left output circuit TRA of multivibrator TR. The coincident presence of these two pulses to the respective input terminals of gate 77 results in an output pulse therefrom which is applied to the input circuit of auxiliary counter flip-flop C0. The presence of this pulse is effective to reverse the condition of operation of auxiliary counter flip-flop C0, thereby producing an electrical signal at its left output terminal C0A. At this time, then, an electrical signal appears at terminal C0A, C1B and C2B of the auxiliary counter circuit. As is shown in table 7, this is the combination of electrical signals which corresponds to auxiliary working circuit X1. As this combination of electrical signals is presented to the associated decoder tree 65, a signal is produced and directed to terminal 87 and to AND gate 88, as indicated.

The clock continues through its sequence until such time that a 5 microsecond write pulse, curve B of FIGURE 1, is present upon the left output terminal W3A of multivibrator W3. As this pulse is again applied to gate 79, FIGURE 3, coincidentally with, say, another "mark" information bit from input terminal 96, there is an energizing pulse present at all of the input terminals of gate 79, as has previously been described. This, of course, results in an output pulse appearing in the output circuit thereof which is again applied to the various gate circuits through amplifiers 80 and 81 in leads 82 and 83, respectively. In this instance, however, since auxiliary working circuit X1 is energized from terminal 87 of decoder tree 65, the input "mark" information bit is stored in the second magnetic member of the first row in the form of a "1" condition of remanence of that member.

As the clock continues through its cycle and the auxiliary counter is successively stepped so as to produce the combination of electrical signals which corresponds to auxiliary working circuits X2, X3, X4, X5, X6 and X7, the input character is stored in the initial character position of the matrix.

At the time of the combination of electrical signals present in the auxiliary counter corresponds so that auxiliary working circuit X7, terminal 88 of decoder tree 65 is, of course, energized. This signal is presented to AND gate 86, FIGURE 2, as labeled, and upon the appearance of the next 1 microsecond stop pulse, appearing on the left output terminal W4A of multivibrator W4, an output pulse is produced by gate 86 in that the W4A pulse is presented to its other input terminal, as labeled. As the pulse is produced from gate 86 it is presented to the right input circuit of multivibrator TR, thereby producing conduction to the right side thereof and resulting in an output signal at the right output terminal TRB. This signal is in turn presented to the left input circuit of multivibrator H1, reversing its condition of conduction and producing an output signal in its left output terminal H1A.

Going back now to FIGURE 1 where multivibrator RW is indicated, the initial write signal applied to input terminal 66 produced conduction through the right side of multivibrator H0, resulting in an output signal at its right output terminal H0B. This signal was applied to the one input terminal of gate 68; however, it was ineffective in operation in that the other input terminal of gate 68 was connected to output terminal 84 of decoder tree 65, FIGURE 3, as labeled. Since, at that time, the auxiliary counter had stored therein that combination of electrical signals corresponding to auxiliary working circuit X7, terminal 84 of decoder tree 65 was not energized. However, as the auxiliary counter was stepped to its next position, and had stored therein that combination of electrical signals corresponding to auxiliary working circuit X0, terminal 84 of decoder tree 65 was energized in a manner as has previously been described. As terminal 84 was energized at that time, this signal, along with the signal present in output terminal H0B, being coincidentally applied to gate 68 resulted in an output signal appearing in its output circuit which was applied to the right input circuit of multivibrator RW. The application of this signal reversed the condition of operation of multivibrator RW and produced a signal in its right output circuit RWB.

The signal appearing at the right output terminal RWB of multivibrator RW, along with the signal appearing at the left output terminal H1A of multivibrator H1, FIGURE 2, are applied to AND gate 89, FIGURE 2. The coincident presence of these two signals upon the respective input terminals of gate 89 produces an output signal in its output circuit 90 which is applied to the input circuit of the first flip-flop S3 of the write binary counter. As the right side of flip-flop S3 is conducting at this time, refer FIGURE 6, its condition of conduction is reversed, thereby producing an electrical signal at its left output terminal S3B. Therefore, an electrical signal appears at output terminals S3B, S4A and S5A which, in accordance with FIGURE 6, is the combination of electrical signals corresponding to working circuit Y1. The presentation of this combination of electrical signals to input terminals 4, 5 and 7 of decoder tree 2, FIGURE 3, produces an output access signal upon output terminal 21 of decoder tree 2, in a manner as previously described, which is applied to access circuit 11 and to gate circuit 31, interposed between the output terminal 21 of decoder tree 2 and working circuit Y1. In this manner, then, the second character position, with which working circuit Y1 is in operative arrangement is in condition to receive the next character impressed upon the input terminal of the system in a manner as has been detailed here-before.

It should be pointed out at this time that although the signal appearing in the left output terminal H1A of multivibrator H1 is also applied to one of the input terminals of gate 91 which is included in the input circuit of flip-flop R3 of the "read" binary counter, there is no signal produced in the output circuit of gate 91 in that there is no signal present upon the other input terminal which is connected to the left output circuit RWA of multivibrator RW in that its condition of operation has just been reversed as previously described. At this time, then, the combination of electrical signals produced by the "write" binary counter corresponds to that character position with which working circuit Y1 is in cooperative arrangement, while the combination of electrical signals present in the "read" binary counter corresponds to the initial character position with which working circuit Y0 is in operative arrangement.

As has been brought out before, multivibrator H1 is of the type which, after being triggered, will after a specified period of time return to its original operating condition which is with the right side conducting. The reason for this multivibrator is to remove the signal normally present on its right output terminal H1B from gate 76 so that the appearance of an externally generated read or write signal applied to one of the other input terminals of gate 76 will be ineffective to operate relay TR as the clock count pulse from terminal W0A appears until the "read" and "write" binary counters have been advanced one position. At the conclusion of the interval of time designed into multivibrator H1, it returns to its initial operating condition, with the left side conducting, and producing an output signal on its right output terminal H1B which is applied to the input terminal of gate 76. At this time, the system may again be conditioned to receive a character for storage or to read out the character which has already been stored.

Assume that a second character has been received and stored and that terminal 88 of decoder tree 65 of FIGURE 3 has been energized and a stop pulse is present upon the left output terminal of clock multivibrator W4. These signals are coincidentally applied to the respective input terminals of gate 86, FIGURE 2, which reverses the condition of operation of multivibrator TR as has previously been described. The reversal of the condition of operation of multivibrator TR again produces a signal upon its right output circuit TRB which reverses the condition of operation of multivibrator H1. As the pulse present on the right output terminal RWB of multivibrator RW, FIGURE 1, is still present, the signal appearing in the left output circuit H1A of multivibrator H1 produces an output pulse at the output terminal of gate 89 which is applied to the input of flip-flop S3 of "read" binary counter through lead 90. The presence of this pulse reverses the condition of operation of flip-flop S3, again rendering the right side thereof conducting. This means that the right output terminal S3A of flip-flop S3 is transferred from its "0" condition to the "1" condition thereby producing a sensitive wave front pulse which is applied through lead 92 to the input circuit of flip-flop S4, thereby reversing the condition of operation of this flip-flop. At this time, then, there is an electrical signal present upon output terminals S3B, S4A and S5B. In accordance with the table of FIGURE 6, this is the combination of electrical signals which corresponds to that character position with which working circuit Y2 is in cooperative arrangement. As additional characters are received and the "write" binary counter flip-flop S3 is pulsed at the conclusion of the receipt of each character, the "write" binary counter is advanced in this same manner so that the successive combination of electrical signals thereby produced correspond to successive character positions of the magnetic core matrix.

Referring now to the sensing circuit 9, FIGURE 2, after the first character has been received and stored and the "write" binary counter has been advanced so that the combination of electrical signals stored therein corresponds to the character position with which working circuit Y1 is in operative arrangement, an output pulse is produced in lead 57 and is applied through OR gate 69, FIGURE 3, through leads 71 and 73 to OR gates 70 and 72, respectively. In this instance, then, a read enabling pulse and a write enabling pulse are both present and are applied to respective ones of the input terminals of gates 67 and 93, FIGURE 1, as labeled.

This storage system is conditioned for the readout of characters stored in the storage medium through the application of an externally generated read signal applied to read signal input terminal 94. This signal is simultaneously applied to the left input circuit of multivibrator H0 and to one of the input terminals of gate 93, as indicated.

As the signal is applied to the left input circuit of multivibrator H0, the condition of operation of this multivibrator is reversed, thereby producing conduction through the left side thereof which results in an output signal being present upon the left output terminal H0A. As is shown, this output signal is applied to one input terminal of an AND gate indicated at reference numeral 95. However, as the other terminal of gate 95 is connected to terminal 84 of decoder tree 65, FIGURE 3, the signal present at output terminal H0A is ineffective until terminal 84 becomes energized in a manner as has previously been described. Upon the energization, however, of terminal 84, the coincident presence of a pulse at each respective input terminal of gate 95 produces an output pulse therefrom which is applied to the left input circuit of multivibrator RW, thereby reversing its condition of operation and producing an output signal at its left output terminal RWA, indicating that the last operation has been read.

The application of the read signal to one input terminal of gate 93 appears coincidentally with the read enabling pulse signal which is present at the read enabling pulse output circuit terminal of FIGURE 3. Therefore, an output pulse is produced upon the output terminal of gate 93 and is applied through OR gate 74 and lead 75 to one of the input terminals of gate 76, FIGURE 2. Assuming that multivibrator H1 has timed out and is in its normal condition of operation, that is, with the right side conducting and an output signal appearing at its right output circuit terminal H1B, upon the occurrence of a count pulse upon the terminal W0A of multivibrator W0 of the clock circuit, an output pulse will appear in the output terminal of gate 76 and will be applied to the left input circuit of multivibrator TR. This signal serves to reverse the condition of operation of multivibrator TR, producing conduction through the left side thereof and resulting in the presence of an output signal at its left output terminal TRA.

As the clock continues through its sequence, the next pulse produced thereby is a 5 microsecond read pulse, curve E, FIGURE 1, which is produced in the left output terminal W1A of multivibrator W1. This read pulse is applied to one of the input terminals of gate 78, FIGURE 3, as labeled. As a read enabling pulse is present from OR gate 72, as has previously been described, and since a signal is now present in the left output circuit TRA of multivibrator TR, the coincident presence of all three signals to the respective input terminals of gate 78 produces an output signal therefrom which is applied to the respective gate circuits of the auxiliary working circuits and to the respective gate circuits 30, 31, 32, 33, 34, 35, 36 and 37 of the working circuits through leads 98 and 99, respectively.

As the auxiliary binary counter has stored therein the combination of electrical signals corresponding to the first working circuit X0 and the "read" binary counter has stored therein that combination of electrical signals corresponding to working circuit Y0, these respective working circuits are energizable. By passing a half reverse current through each of these circuits, the condition of remanence of that magnetic core intersected thereby will be reversed from its "1" condition to its "0" condition of operation. Upon this reversal of condition of operation, an output pulse is produced in the output circuit winding 100, which is threaded in series through all of the magnetic cores of this matrix, and may be removed therefrom and applied to suitable external equipment through output terminal 101.

As the clock continues through its sequence, upon the next occurrence of a count pulse in the left output terminal W0A of clock multivibrator W0, it is applied to one of the respective input terminals of gate 77, FIGURE 3. As a signal is already present in the left output terminal TRA of multivibrator TR, which is connected to the other input terminal of gate 77, the coincident presence of these two pulses produces an output pulse in the output terminal of gate 77 which is applied to the input circuit of auxiliary binary counter flip-flop C0. As this pulse is received, the condition of operation of flip-flop C0 is reversed, thereby rendering the left side thereof conducting and producing an output electrical signal upon its left output circuit terminal C0A. At this time, therefore, there is an electrical signal appearing in the auxiliary binary counter at output terminal C0A, C1B and C2B. In accordance with the table of FIGURE 7, this is the combination of electrical signals of the auxiliary counter which corresponds to the second auxiliary working circuit X1. Therefore, through the operation of decoder tree 65, terminal 87 thereof is now energized with a signal which is applied to associated gate 88. Upon the occurrence of the next read pulse, from the left output terminal W1A of clock multivibrator W1, which is applied to gate 78 in coincidence with the TRA signal and the read enabling signal, an output pulse is produced at the output terminal of gate 78 which is applied to the respective gates through leads 98 and 99. As the "read" binary counter has not been advanced, working circuit Y0 is energizable and, since auxiliary counting circuit has been advanced, auxiliary working circuit X1 is now energizable. Through the application of a reverse current therethrough, the magnetic core intersected thereby may have its condition of magnetic remanence reversed from its "1" condition to its "0" condition, thereby producing an output pulse in output circuit coil 100, which is available at output terminal 101 as before.

This sequence of operation continues through until the combination of electrical signals corresponding to auxiliary working circuit X7 is present in the auxiliary binary counter and is impressed upon the associated decoder tree 65, which produces a pulse energizing terminal 88. As terminal 88 becomes energized and the last magnetic core of the first row has been interrogated through the operation of a read pulse from terminal W1A of the clock multivibrator W1 and applied through gate 78 and leads 98 and 99 as described before, the signal still appearing in terminal 88 is applied to one of the input circuit terminals of gate 86, FIGURE 2. As the clock continues through its sequence, a 1 microsecond stop pulse, curve C, FIGURE 1, appearing in the left output terminal W4A of clock multivibrator W4, is also applied to the other input terminal of gate 86, FIGURE 2, as labeled. The coincident presence of these two pulses, therefore, produces an output pulse in the output terminal of gate 86 which is applied to the right input circuit of multivibrator TR. This signal serves to reverse the condition of operation of multivibrator TR, thereby rendering its right side conductive and producing an output signal for its right side output terminal TRB. This signal is applied to the left input circuit of multivibrator H1, thereby rendering the left side thereof conducting and producing an output signal upon its left output terminal H1A. This signal is applied to one of the input circuit terminals of gate 91, associated with read multivibrator flip-flop R3. As multivibrator RW, FIGURE 1, is in that condition of operation which produces a signal at its output terminal RWA, this signal is also applied to the other input terminal of gate 91. The coincident presence of these two signals produces an output signal in the output circuit thereof which is applied to the input circuit of flip-flop R3 of the "read" binary counter. This signal reverses the condition of operation of read flip-flop R3, thereby rendering the left side conducting and produces an output signal in its left output terminal R3A. In this condition, then, the combination of electrical signals produced by read counter is such that a signal appears at output terminals R3A, R4B and R5B. Referring to the table of FIGURE 6, it may be noted that this is the combination of signals which corresponds to the second character position with which working circuit Y1 is in operative arrangement. As this combination of signals is presented to the decoder tree 2, FIGURE 3, through input terminals 3, 4 and 8, thereof, an access signal is produced thereby and directed to output terminal 21, in a manner as has previously been described, which is impressed upon access circuit 11 associated with working circuit Y1. In this case, then, the system is conditioned to readout the character stored in the second character position of the storage matrix, in a manner as has previously been described.

As the "read" binary counter is successively stepped, that combination of electrical signals which corresponds to successive working circuits is produced thereby in the manner as has previously been described in regard to the "write" binary counter.

While a preferred embodimnt of this invention has been shown and described, it will be obvious to those skilled in the art that various modifications and substitutions may be made without departing from the spirit of this invention which is to be limited only within the scope of the appended claims.

What is claimed is:

In combination, a storage medium having a predetermined number of discrete character positions into each of which a character expressed in binary form may be entered and withdrawn, first and second ring counters each of which has a count capacity equal to said predetermined number, first means coupling said first counter to said storage medium and responsive to an external write pulse selectively applied thereto for entering a character in that character position of said storage medium which corresponds to the count registered in said first counter, second means coupled to said first counter and said storage medium for advancing said first counter one count in response to a character having been entered in a character position of said storage medium, third means coupling said second counter to said storage medium and responsive to an external read pulse selectively applied thereto for withdrawing a character from that character position of said storage medium which corresponds to the count registered in said second counter, fourth means coupled to said second counter and said storage medium for advancing said second counter one count in response to a character having been withdrawn from a character position of said storage medium, fifth means responsive to said write and read pulses selectively applied thereto for indicating whether the last previously applied pulse was a write or read pulse, sixth means coupled to said first and second counter for indicating coincidence in the counts registered in said first and second counters, and seventh means coupled to said first, third, fifth and sixth means for preventing the entering of a character in response to the last previously applied pulse being a write pulse and the coincidence in the counts registered in said first and second counters and for preventing the withdrawal of a character in response to the last previously applied pulse being a read pulse and the coincidence in the counts registered in said first and second counters.

References Cited in the file of this patent

UNITED STATES PATENTS

| | | |
|---|---|---|
| 2,872,666 | Greenhalgh | Feb. 3, 1959 |
| 2,895,124 | Harris | July 14, 1959 |
| 2,931,014 | Buchholz et al. | Mar. 29, 1960 |
| 2,933,720 | Newhouse et al. | Apr. 19, 1960 |